Figure 1:
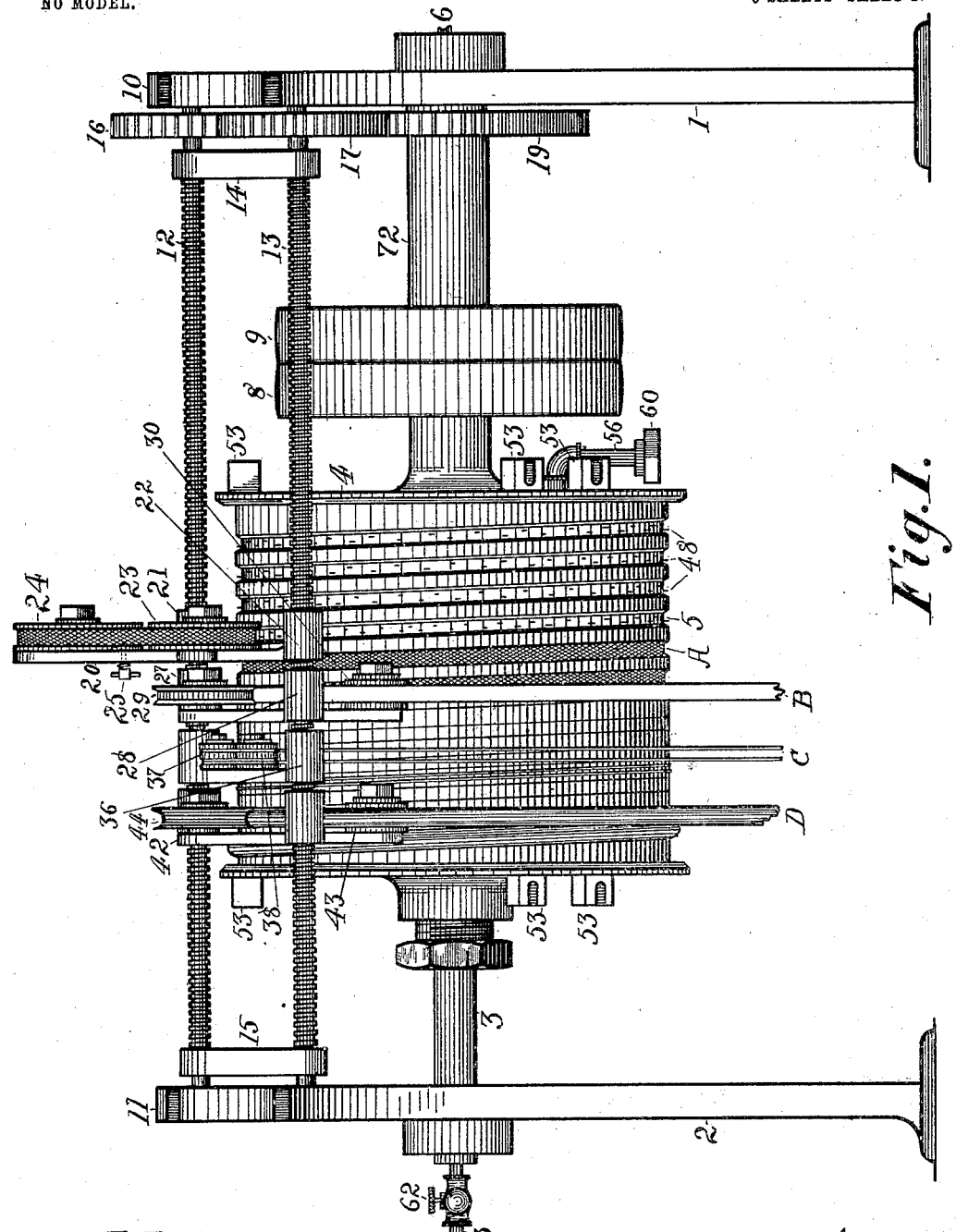

No. 725,155. PATENTED APR. 14, 1903.
F. A. SEIBERLING.
APPARATUS FOR MANUFACTURING AND VULCANIZING RUBBER TIRES.
APPLICATION FILED JULY 18, 1902.
NO MODEL. 6 SHEETS—SHEET 1.

Witnesses:
Walter Bowman
W. G. Good

Inventor:
Frank A. Seiberling,
By Humphrey & Humphrey,
Attorneys

No. 725,155. PATENTED APR. 14, 1903.
F. A. SEIBERLING.
APPARATUS FOR MANUFACTURING AND VULCANIZING RUBBER TIRES.
APPLICATION FILED JULY 18, 1902.
NO MODEL. 6 SHEETS—SHEET 2.

Witnesses: Inventor:
Walter Bowman Frank A. Seiberling,
W. G. Good by Humphrey & Humphrey,
Attorneys.

No. 725,155. PATENTED APR. 14, 1903.
F. A. SEIBERLING.
APPARATUS FOR MANUFACTURING AND VULCANIZING RUBBER TIRES.
APPLICATION FILED JULY 18, 1902.
NO MODEL. 6 SHEETS—SHEET 3.

Witnesses:
Walter Bowman
W. G. Good

Inventor:
Frank A. Seiberling
By Humphrey & Humphrey,
Attorneys.

No. 725,155. PATENTED APR. 14, 1903.
F. A. SEIBERLING.
APPARATUS FOR MANUFACTURING AND VULCANIZING RUBBER TIRES.
APPLICATION FILED JULY 18, 1902.
NO MODEL. 6 SHEETS—SHEET 5.

Witnesses: Inventor:
Walter Bowman Frank A. Seiberling,
W. F. Good by Humphrey & Humphrey,
Attorneys.

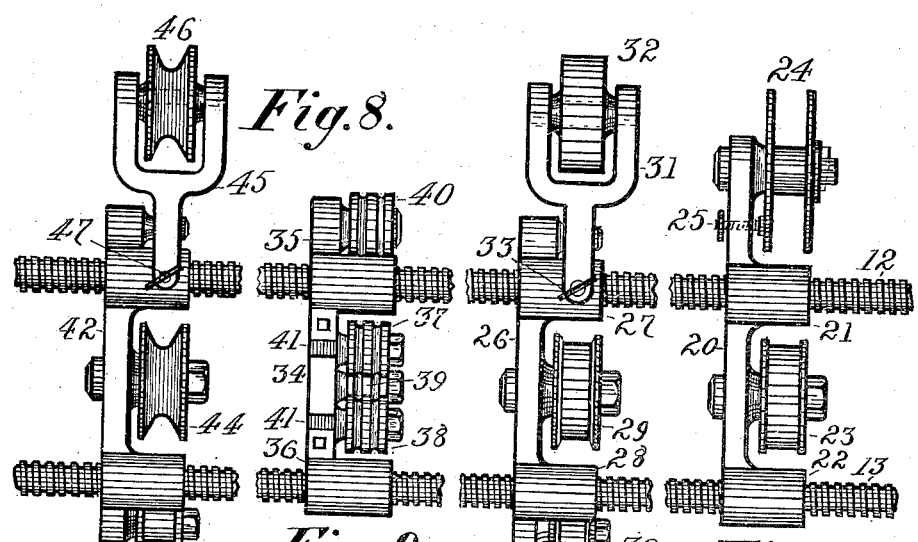

UNITED STATES PATENT OFFICE.

FRANK A. SEIBERLING, OF AKRON, OHIO.

APPARATUS FOR MANUFACTURING AND VULCANIZING RUBBER TIRES.

SPECIFICATION forming part of Letters Patent No. 725,155, dated April 14, 1903.

Application filed July 18, 1902. Serial No. 116,051. (No model.)

*To all whom it may concern:*

Be it known that I, FRANK A. SEIBERLING, a citizen of the United States, residing at Akron, in the county of Summit and State of Ohio, have invented a certain new and useful Improvement in Apparatus for Manufacturing and Vulcanizing Rubber Tires, of which the following is a specification.

My invention has relation to improvements in machines for the manufacture and vulcanization of rubber tires, hose, and kindred articles of rubber that are capable of being constructed in great lengths or sections. Heretofore it has been generally customary to vulcanize such articles in straight molds, and in doing so two difficulties are encountered. In the first place, as these articles are vulcanized in metallic molds their length is necessarily limited to the length of the mold that can be practically used. In the second place, where solid rubber tires are thus made and afterward bent about a wheel the outer or tread surface is stretched or strained, and in so doing rendered less dense in the tread than in its normally vulcanized condition and causing it to wear rapidly and to open on a slight cut, which results in impairing its lasting quality. To remedy this defect, it is customary to upset these tires longitudinally; but this is also objectionable, as it is impossible to evenly distribute the pressure necessary thereto, and it also condenses the inner periphery of the tire, thereby resulting in a waste of material.

The object of my invention is to overcome these objections and to provide means whereby solid tires or kindred articles can be easily and quickly vulcanized of much greater lengths than have been possible heretofore and in the manufacture of which all the parts shall be in substantially their normal condition for mounting on the wheel. The invention contemplates forming these articles in great length—as, for instance, forming tires from certain essential portions, to wit: the inner duck or canvas, the inner half of the tire divided in a plane substantially parallel to its base in cross-section, the interposition of the longitudinal wire and the final covering or tread portion, each part directed to its position by instrumentalities, the rubber portions being in such plastic state as to cause them to cohere, and finally employing pressure-rollers to compress together the component parts of the tire, with coacting mechanism to cause these several parts to conjointly perform their several functions. The several essential component parts are fed successively onto a revoluble hollow metallic drum having a spiral groove in its face to form one half portion of the mold, with outer hollow jackets to inclose the drum having on their interiors a corresponding groove adapted to register with the grooves of the drum and contitute the other half of the mold. It further contemplates means for introducing live steam within the drum and hollow jackets to heat these parts to vulcanize the rubber in the mold-groove, together with means for removing water accumulated therein from condensation.

The main object of my invention is to produce a simple and efficient machine capable of producing these effects and which shall have means for sustaining the wires in their relative position during the process of building up the tire from its component parts and in the process of vulcanization.

To the accomplishment of the aforesaid object my invention consists in the peculiar and novel construction, arrangement, and combination of parts hereinafter described and then specifically claimed, reference being had to the accompanying drawings, forming a part of this specification.

Figure 2:
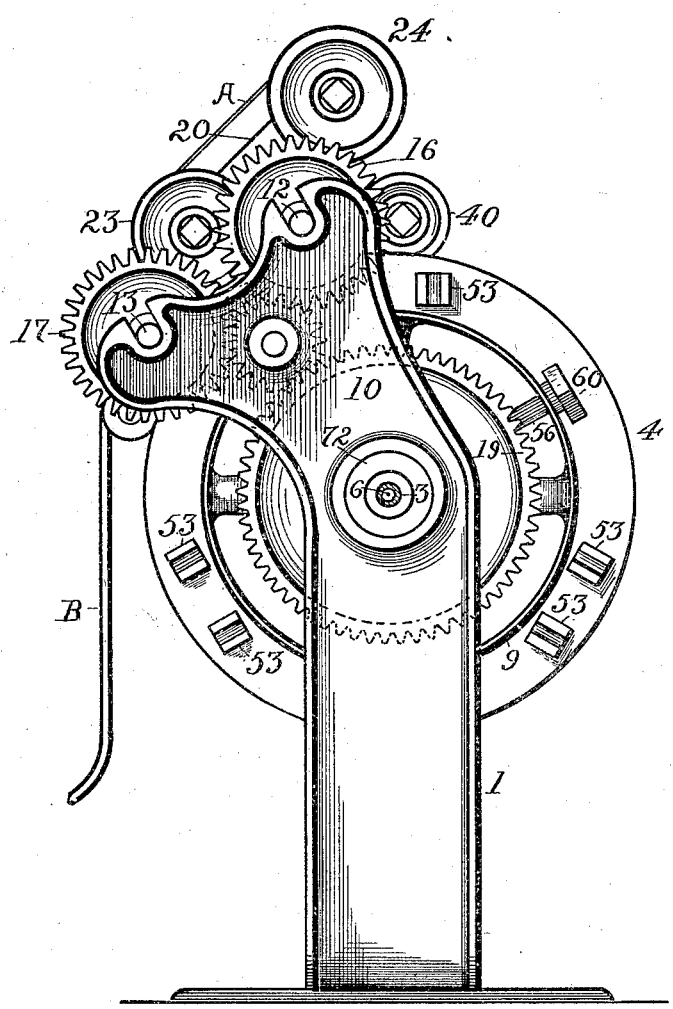
Figure 3:
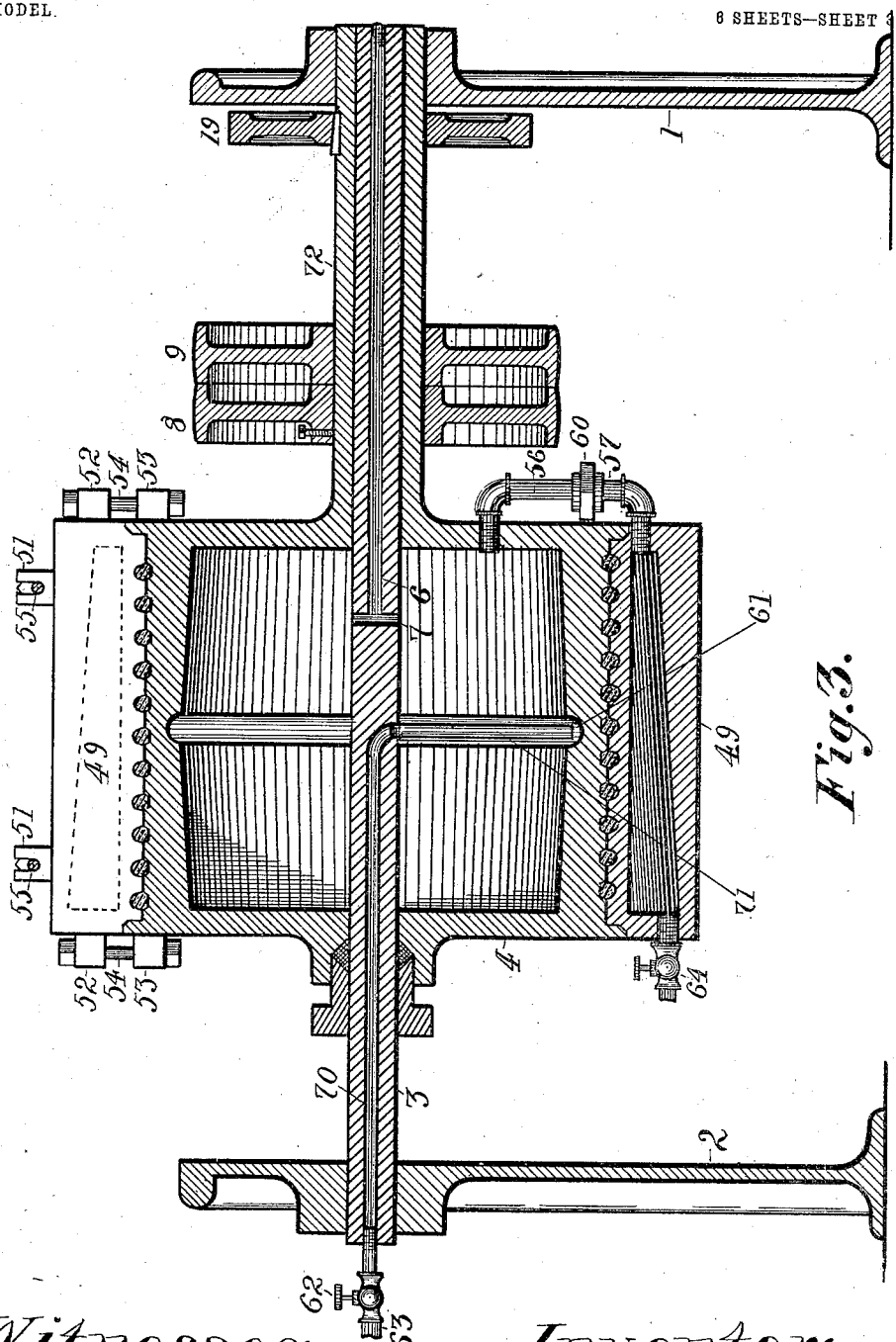
Figure 4:
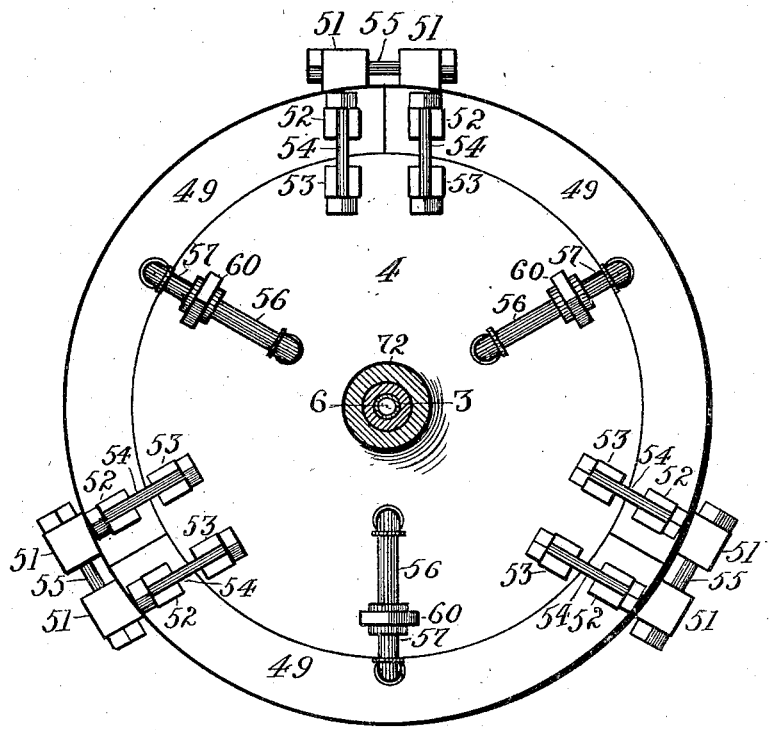
Figure 5:
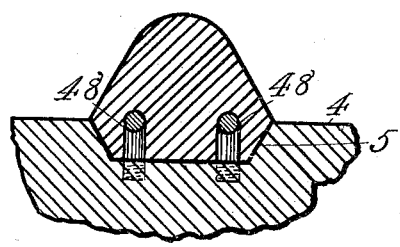
Figure 6:
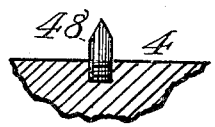
Figure 7:
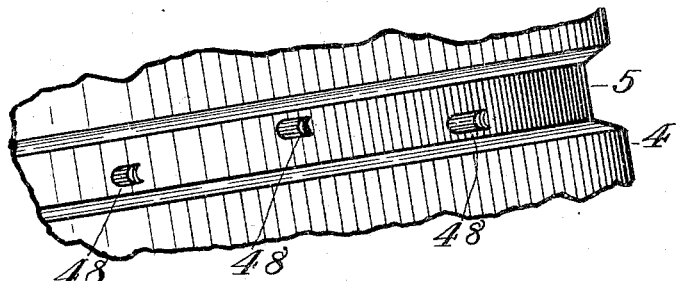

In the accompanying drawings, in which similar reference-characters indicate like parts in the different figures, Figure 1 is a side elevation of my improved machine with the jackets removed; Fig. 2, an end elevation looking from the right of Fig. 1; Fig. 3, a vertical central section; Fig. 4, an end elevation of the drum and jackets detached from associated parts and showing the manner of uniting the jacket therewith and the steam connections with the drum and jackets; Fig. 5, a section of a portion of the drum lengthwise of its axis, showing the studs for cutting the canvas and supporting the wires; Fig. 6, a similar section transverse to its axis to show the cutting edge of the studs; Fig. 7, a plan of a portion of the periphery of the drum, showing one of the grooves with the wire-supporting studs therein; Fig. 8, an elevation of the final guide and compression rollers for the tread portion of the tire; Fig. 9, a similar view of the device for feeding and guiding the wires; Fig. 10, a similar view of the device for guiding and feeding the inner half or section of the tire and compressing it in place; Fig. 11, a similar view of the device for feeding the inner canvas or duck strip, and Figs. 12, 13, and 14 side elevations of Figs. 8, 9, and 11.

Referring to the drawings, 1 and 2 are oppositely-disposed supports or housings properly secured to a floor or base and in and extending between which is an irrevoluble shaft 3, on which is secured a metallic drum or closed hollow cylinder 4, capable of revolution. This drum 4 is made integral with or connected to a long sleeve 72, which extends to the right in Figs. 1 and 3 and enters the housing 1 and incloses the shaft 3. The intermediate portion of the periphery of this drum a short distance from each end has a deep continuous spiral groove 5, which in cross-section is of the proper shape to form the exterior of the inner half of the article to be built up and vulcanized, as in this instance a tire. The shaft 3 is hollow at each end, the openings 6 and 70, forming this hollow, extending inwardly from each end toward the center, near which they terminate, and each is provided at its inner end with lateral openings 7 and 71 to connect with the interior of the cylinder. Sleeve 72 is provided, preferably, with fast and loose pulleys 8 and 9 in the usual manner of belt-driven shafting. The fast pulley 8 is for revolving the drum during the process of feeding into the groove the successive layers that go to build up the tire. These layers are prepared in great lengths and placed in proper respective positions in coils or otherwise adjacent to the drum upon the floor or a convenient platform, or they may be wound on reels, either method permitting of their ready use and application. For properly applying these successive portions of the tire I provide supports on the housings 1 and 2, being preferably a portion thereof, like at each end, (represented by numerals 10 and 11 in the drawings.) In each support 10 and 11 are like bearings, open outwardly to receive the ends of parallel shafts 12 and 13. These shafts 12 and 13 are united near each end by yokes 14 and 15 and between which the shafts 12 and 13 are screw-threaded. Mounted on these screw-threaded portions of the shafts are the devices hereinafter described for feeding and guiding the different elements to make up the tire and on which they travel.

The different mechanisms for applying the component parts of the tire consist of devices, as shown in Figs. 8 to 14, inclusive, and the first for applying the canvas base of the tire is shown in Figs. 11 and 14, in which 20 is a carriage, bearing at each end screw-threaded sleeves 21 and 22 to engage and travel on the shafts 12 and 13, respectively. This carriage bears on one side a stud, on which is mounted a roller 23, provided with flanges to prevent the strip of fabric A from slipping therefrom, and above the shaft 12 and mounted similarly is a reel 24, filled with a sufficient supply of fabric snugly coiled. The reel 24 is provided with a brake 25, the tension of which is capable of being varied to accommodate it to the requirements of the case, but designed at all times to impose such a resistance to the unwinding of the strip of fabric A as will cause it to firmly bed in the spiral groove 5 on the surface of the drum. The second carriage 26 (shown in Fig. 10) in like manner bears similar screw-threaded sleeves 27 and 28, between which is a guide-roller 29, and beneath and partially below the sleeve 28 is a small guide-roller 30. Pivotally attached to the upper end of the carriage 26 is a forked arm 31, bearing between its forks a flat-faced roller 32 to press on the face or upper portion of the base part of the tire in the groove of the drum, and at the opposite end of the arm 31 is an adjusting-screw 33, that bears on the carriage and by which the pressure of the roller 32 can be varied as desired upon the rubber in the groove. The third carriage 34 (shown in Figs. 9 and 13) is constructed substantially like the preceding carriages 20 and 26, but bears between the upper and lower sleeves 35 and 36 two like rollers 37 and 38 and an inset roller 39, all having grooves in their peripheries to guide the wires C, and an upper grooved roller 40, mounted on an arm of the carriage that is turned toward the drum 4, so as in operation to lie near its periphery and in the path of the wires C as they are fed to the drum and serve to act as guides therefor. The journals of the rollers 37 and 38 fit in boxes that slide in ways in the carriage 34, substantially radial to the axis of roller 39 and are adjustably forced inward by hand-screws 41. The fourth and last carriage 42 is substantially like the carriage 26 and is shown in Figs. 8 and 12, and the difference between them is as follows: Carriage 42 bears at its lower end a deeply-grooved roller 43, on which the inner or flat face of the tread portion runs. A roller intermediate of the shafts 12 and 13, whose number is 44 and having a face conformed to fit the outer or curved face of the tread portion of the tire, serves as a guide to steady the imposition of this portion of the tire upon the base already described. This tread bears the letter D in the drawings. On this carriage above the shaft 12 extends an arm on which is pivoted a lever 45, forked at its free end and bearing between the forks a roller 46, grooved in like manner as the roller 44 and whose pressure against the tire is obtained in the same manner by an adjusting-screw 47 as that of the roller 32 on the carriage 26.

It will be obvious from the foregoing statement that as the drum is revolved the several successive component parts of the tire are led into the grooves of the drum in their appropriate order. To properly support the wires C and maintain them in their relative positions with respect to the other parts of the tire, there are fixed in the drum, at the bottom of the spiral groove 5, at suitable intervals, studs 48, (shown in Figs. 5, 6, and 7,) the outer ends of which are sharpened from each side to an edge parallel with the axis of the drum, and these edges are notched or curved in an opposite direction to form a rest or seat for the wires C. The studs 48 project from the bottom of the groove 5 sufficiently to enable the wires C to rest on the previously-placed base portion.

The operation is as follows: The constituent parts of the tire being assembled in coils on the floor or a platform or on reels, as heretofore suggested in regard to the fabric strip A, and the feeding and pressing devices being in their progressive order moved along the shafts 12 and 13 beyond the end of the drum from which its spiral commences, the strip of fabric A is led from the reel 24 on the side away from the drum around the roller 23 to the beginning of the spiral groove 5 and temporarily secured so as to draw. The tension of this band or strip of canvas is regulated, as stated, by the brake 25 and should be sufficient to cause the studs 48 to cut through the fabric and permit it to bed firmly on the bottom of the groove 5. Motion is then communicated to the drum and the associated parts, and at the end of the second revolution the carriage 26 will have been brought into position to apply the inner band of rubber B. This passes over the roller 30, then in front of the middle roller 29, on which it rolls. It is guided into the groove 5 and pushed into place, and its end temporarily fastened on the pins or studs 48, and thence under the roller 32, by which it is firmly forced into the groove 5 with sufficient force to cause the studs 48 to cut substantially therethrough, the pressure of the roller being adjusted and regulated by the screw 33. At the end of the next succeeding revolution the carriage 34 will in turn be brought into position to apply the wires C, which will be drawn from any convenient source of supply and pass back of the rollers 37 38, the pressure of which is regulated by the screws 41, and under the roller 39, by which they are firmly pressed onto the tops of the studs 48, and are thus prevented from sinking into the strip of rubber already in the groove 5. The effect of passing the wires C between the rollers 37 38 and the roller 39 is to curve or bend the wires into substantially the circle they will assume in the tire when completed. At the end of the next succeeding second revolution of the drum the carriage 42 will in turn have come into position to apply the outer half or tread portion of the tire, which passes from a source of supply over the roller 43 and thence under the rollers 44 and 46, by the former of which it is partially guided to place on the other component parts of the tire in the groove 5 and by the latter firmly pressed thereon to cause it to cohere, the pressure of the roller 46 being regulated by the screw 47. By the continued revolution of the drum 4 these several parts are wound in their respective order on the groove 5 until each in turn reaches its opposite end, when they are cut, thus leaving a completed unvulcanized tire in said groove with embedded wires, whose outer ends are also temporarily secured by any preferred means. The shafts 12 and 13, with the yokes 14 and 15 and the various connected parts for applying the tire in its several stages, are then lifted from their bearings in the housings and removed.

In the foregoing description the drum forms one half of the vulcanizing-mold. The outer half consists of hollow metallic segments arranged to surround the drum and constitute what has been hereinbefore denominated the "jacket." This portion of the machine is shown in Figs. 3 and 4. Each segment 49 of this jacket is hollow, with its inner periphery adapted to accurately fit the outside of the drum, and has an internal groove arranged to register with the groove of the drum. Each segment has on its exterior at its edges series of pairs of parallel lugs 51 to receive bolts 55 to bind the ends of the segments together. They also have, as shown in Figs. 3 and 4, end lugs 52, arranged to register with the end lugs 53 on the end of the drum 4 and to receive bolts 54, and by this means the jacket is clamped in proper position on the drum. Steam to heat these jackets is carried from the interior of the drum by a series of pipes 56 and 57, respectively, as indicated in the drawings, and are connected by couplings or unions 60. The green or unvulcanized tire having been built up on the groove 5, as hereinbefore described, the segments 49 of the jacket are then placed in proper position about the drum so that their grooves will receive the projecting portion of the tire and secured in place. The steam connections on the end of the drum having been made, live steam is then introduced through the steam-pipe 6, which escapes through the lateral openings 7 into the interior of the drum and fills its cavity and thence it passes through the pipes 56 and 57 to the interiors of the segments of the jacket. In introducing steam, as just described, it is found that a considerable quantity of water accumulates in both drum and jacket, due to the condensation of the steam upon encountering the comparatively cool metal parts, and as this accumulation is very objectionable by reason of the fact that it prevents the even and perfect vulcanization of the tire in the mold it has been found necessary to remove it therefrom as rapidly as possible, and as a means for accomplishing this end a deep groove 61 is cut in the interior of the shell of the drum 4 entirely around its circumference equidistant from the ends, and the inner faces of the drum are sloped, so that any water deposited thereon will run into the groove 61 by gravitation. The lateral opening of the hollow 70 in the shaft 3 is provided with a downwardly-projecting pipe 71, whose lower termination is within the groove 61 and extends nearly to its bottom—so low, in fact, that any accumulation of water in the groove 61 will cover the lower end of the pipe. The opening 70 in the shaft 3 is provided at the outer end with a valve 62, from which extends a pipe 63 to any desired place. Thus it will be seen that in the vulcanization of articles on the periphery of the drum as live steam is introduced to the interior through the inlet 7 the air is driven out through the pipe 63 until the drum has acquired a sufficient degree of heat, and during the heating a large quantity of steam is condensed into water, which is deposited on the interior of the drum and which gradually finds its way to the groove 61, from whence it is driven by the pressure of the live steam constantly entering the drum out through the pipe 71. To clear the jackets 49 from accumulations of water, the outer surface of the interior of each jacket is sloped to the end of the drum opposite that through which live steam is introduced, and the water is permitted to flow out by gravitation through suitable stop-cocks 64. I do not confine myself to this particular method of removing the water, as any other method more readily applicable or convenient may be used without departing from the spirit of my invention. During the process of vulcanization the drum 4, with its jacket, may be revolved or not, as may be desired or as experience shall determine as the best. The several parts of the machine are then separated in the inverse order in which they were united and the now-complete vulcanized tire removed, from which suitable lengths can be cut for use.

Having thus described my invention, what I claim, and desire to secure by Letters Patent, is—

1. A machine for the manufacture of rubber tires, &c., consisting of a grooved drum revoluble on its axis and means for heating the same as desired.

2. A machine for the manufacture of rubber tires, &c., consisting of a drum provided with a groove to receive the article, means to feed said article onto said drum, means to revolve said drum when desired and means to heat said drum at will.

3. A machine for the manufacture of rubber tires, &c., consisting of a grooved drum to receive the tire, means for inclosing said drum and tire, means for heating them while together and means for revolving said drum.

4. A machine for the manufacture of rubber tires, &c., consisting of a drum provided with means to receive a tire on its periphery, means for inclosing said tire while so placed, means for introducing a heating medium into said drum and inclosing means to cause the vulcanization of said tire.

5. A machine for the manufacture of rubber tires, &c., consisting of a drum to receive a tire on its periphery, means for revolving said drum at will, means for inclosing said tire and drum and means for connecting said drum and inclosing means with a source of steam-supply.

6. In a machine of the class designated the combination of a drum, a groove in its periphery, means for feeding the component parts of a tire into said groove in their respective order and means to vulcanize the tire while on said drum.

7. In a machine of the class designated the combination with a drum revolubly mounted, a groove in its periphery, means for feeding the component parts of a tire into said groove, means for inclosing said tire while on said drum means for heating said parts and means for revolving said drum during the application of said heat.

8. In a machine of the class designated the combination of a drum grooved in its periphery, means for feeding the component parts of a tire into said groove in order, together with means for compressing said parts of said tire during the before-mentioned process.

9. In a machine of the class designated the combination of a grooved drum, means to revolubly sustain said drum, means for feeding the necessary parts of a tire onto said drum in order and means for feeding forward the tire-feeding means at a desired speed.

10. In a machine of the class designated the combination of a grooved drum revolubly mounted, means for feeding the various portions of a tire into said groove in order, means for sustaining and feeding forward the tire-feeding means, and means for actuating said drum and feeding means simultaneously.

11. In a machine for manufacturing rubber tires, &c., the combination of a drum, a spiral groove therein, means for feeding a tire in portions into said groove, means for operating and sustaining said feeding means and means for revolving said drum independently after the removal of said tire-placing means.

12. In a machine of the class designated the combination of means for winding the successive elements of a rubber tire on a receiving means, means for inclosing said tire when so placed, means for introducing steam or heat into said receiving and inclosing means and means for removing the water due to condensation.

13. In a machine of the class designated the combination of a spirally-grooved drum, means to feed thereon in due order the necessary component elements of a rubber tire, means to properly guide each element to its respective seat and means to inclose the said tire when on said drum and means for applying a vulcanizing agent thereto.

14. In a machine of the class designated the combination of a drum grooved in its periphery, means for properly guiding and feeding in due order the necessary component parts of a rubber tire into said grooved drum, means for sustaining said drum revolubly, means for sustaining said feeding mechanism in a similar manner and means for securing the mutual coöperation of the last two means.

15. In a machine of the class designated the combination of a drum revolubly mounted, a spiral groove in its periphery, a hollow shaft to sustain said drum, a screw-threaded shaft adjacent to said drum-shaft a series of carriages mounted on said threaded shaft each arranged to supply to the said groove one of the component parts of a tire and means to cause the carriages and drum to coöperate.

16. In a machine of the class designated the combination of a drum spirally grooved, means for revolving the drum, means for feeding onto said drum the various component parts to a tire, means for feeding the feeding means along the face of said drum, the first of said feeding devices being a reel of fabric, substantially as shown and described.

17. In a machine of the class designated the combination of a drum spirally grooved to receive a tire in the process of manufacture, a carriage arranged to travel along the face of the drum, a reel of fabric mounted on said carriage, a guide to direct the passage of the fabric from the reel to the drum, a tension device to regulate the tension of said fabric and means to propel the carriage.

18. In a machine of the class designated, the combination of a drum to receive the various parts of a tire, a carriage to travel along the drum-face, a series of suitable guide and pressure rollers to regulate the passage of a part of the rubber portion of a tire to the drum mounted on said carriage and means to propel the said carriage along the face of the drum.

19. In a machine of the class designated the combination of a grooved drum to receive the various parts of a rubber tire in the process of construction, a carriage to travel along the drum-face, rollers mounted on said carriage to direct the placing of wires in the body of said tire and means to cause the movement of said carriage.

20. In a machine of the class described, the combination of a grooved drum to receive the various parts of a rubber tire in the course of construction, a carriage to travel along the face of said drum, means mounted on said carriage to bend wires fed from said carriage to said drum and means to cause the movement of said carriage.

21. In a machine of the class designated the combination of a drum grooved on its face to receive the various parts of a rubber tire in the course of construction, a carriage mounted to travel along the face of the drum, means on said carriage to direct and guide the tread portion of a rubber tire from said carriage to said groove on said drum and means for actuating said carriage.

22. In a machine of the class designated the combination of a grooved drum, a carriage arranged to travel along the face of said drum, means mounted on said carriage to feed the rubber tread portion of a tire onto said drum, adjustable means on said carriage to press the rubber tread into place and means for causing the passage of said carriage along the face of said drum.

23. In a machine of the class designated the combination of a grooved drum to receive the various parts of a rubber tire in the course of construction, a series of carriages mounted in juxtaposition to the face of said drum, means to cause the movement of said carriage along the face of the drum, independent means mounted on each carriage to feed the various parts of a rubber tire simultaneously into said groove and means for vulcanizing said tire while on said drum.

24. In a machine of the class described the combination of a grooved drum to receive the various parts of a rubber tire in the course of construction of which parts longitudinal wires form an element, means to feed these various parts into said grooves, a series of studs placed in the bottom of said groove with notched or grooved tops to support said wires.

25. In a machine for the manufacture of rubber tires the combination of a grooved drum to receive the various parts of a rubber tire in the course of construction, of which, fabric, wire and rubber constitute the elements, with radial studs in the bottom of said groove having sharpened outer ends to pass through said fabric and a part of said rubber and sustain said wire during the said construction.

26. In a machine for the construction of rubber tires, &c., the combination of a drum, a groove in its periphery, a casing or jacket to inclose said drum when said tire is wound thereon, a hollow shaft with openings in the interior of said drum for the admission of live steam.

27. In a machine of the class designated the combination of a hollow drum, a peripheral groove therein, a jacket consisting of a number of hollow segments to inclose the drum when encircled by a rubber tire and means for simultaneously heating both the jackets and drum when desired.

28. In a machine of the class designated the combination of a drum, a peripheral groove therein, a number of segmental jackets to inclose said drum when encircled by a rubber tire, a registering groove in the interior of said jackets to inclose the portion of the tire projecting beyond the general surface of said drum.

29. In a machine of the class designated the combination of a drum, a peripheral groove therein, a number of segmental jackets to inclose said drum when encircled by a rubber tire, means to simultaneously heat both drum and jackets, and means for temporarily uniting the jackets to each other and to said drum.

30. In a machine of the class designated the combination of a drum, a peripheral groove therein, a number of segmental jackets to inclose said drum when encircled by a rubber tire, means for retaining said jackets in place temporarily and means for connecting the interior of said drum with the interiors of the several jackets said connections being detachable at will.

31. In a machine of the class designated the combination of a drum, a peripheral groove therein, a number of segmental jackets to inclose said drum when encircled by a rubber tire, means for retaining said jackets in place when desired, means to heat the interiors of said jackets and drum and means to drain from said jackets and drum the water due to the condensation of the heating medium.

32. In a machine of the class designated the combination of a pair of oppositely-disposed housings with bearings for a drum-shaft, a drum-shaft mounted therein, a drum on said shaft, a peripheral groove in the drum, a number of carriages each arranged to feed to said groove one of the elements to make a rubber tire, a pair of threaded shafts parallel with the drum-shaft to sustain the carriages and cause them to travel along adjacent to the drum-face and means to simultaneously operate the three shafts.

In testimony that I claim the above I hereunto set my hand in the presence of two subscribing witnesses.

FRANK A. SEIBERLING.

In presence of—
 C. P. HUMPHREY,
 C. E. HUMPHREY.